(12) United States Patent
Canale (10) Patent No.: US 6,435,754 B1
(45) Date of Patent: Aug. 20, 2002

(54) TELESCOPIC EXTENSION FOR AN ELECTRIC HOUSEHOLD APPLIANCE

(75) Inventor: Giuseppe Canale, Gorla Minore (IT)

(73) Assignee: OMEC S.p.A., Gorla Minore (IT)

( * ) Notice: Subject to any disclaimer, the term of this patent is extended or adjusted under 35 U.S.C. 154(b) by 0 days.

(21) Appl. No.: 09/684,632

(22) Filed: Oct. 10, 2000

(30) Foreign Application Priority Data

Oct. 11, 1999 (EP) .............................................. 99830636

(51) Int. Cl.⁷ ................................................. A49L 9/00
(52) U.S. Cl. .................. 403/109.2; 403/377; 403/322.2
(58) Field of Search ........................... 403/109.1, 109.2, 403/109.7, 377, 379.1, 322.2

(56) References Cited

U.S. PATENT DOCUMENTS 6,007,268 A * 12/1999 Whittington et al. 403/109.1 X
6,152,645 A * 11/2000 Sanford ............... 403/322.2 X

FOREIGN PATENT DOCUMENTS

| DE | 196 15 814 A | 10/1996 |
| EP | 0 293 518 B1 | 2/1992 |
| EP | 9 552 481 A | 7/1993 |
| EP | 0 553 482 A | 8/1993 |
| EP | 0 601 620 B1 | 9/1997 |

* cited by examiner

Primary Examiner—Lynne H. Browne
Assistant Examiner—John R. Cottingham
(74) Attorney, Agent, or Firm—Nixon & Vanderhye, P.C.

(57) ABSTRACT

A telescopic extension for an electric household appliance comprises an inner tube, an outer tube, a sleeve, at least one first constraining element, a thrusting slider, resilient elements and an actuating element; in the extension the sleeve is arranged between the inner tube and the outer tube having a cross-section of substantially constant diameter, the sleeve is provided with a longitudinal cavity and a recess formed on the bottom of the cavity, the thrusting slider is housed in the longitudinal cavity and retained radially by the outer tube, the thrusting slider is provided with at least one first slot and the resilient means are housed in the first slot of the thrusting slider and are engaged with a recess of the sleeve.

29 Claims, 7 Drawing Sheets

TELESCOPIC EXTENSION FOR AN ELECTRIC HOUSEHOLD APPLIANCE

This application is based on European Patent Application No. 99830636.9 filed on Oct. 11, 1999, the content of which is incorporated hereinto by reference.

The present invention relates to a telescopic extension for an electric household appliance, such as a vacuum cleaner and the like.

Telescopic extensions for electric household appliances are known, said extensions comprising an inner tube and an outer tube sealingly slidable inside one another, a sleeve, a constraining means capable of locking together the inner tube and the outer tube, a thrusting slider engaging the constraining means through the action of resilient means, and actuating means operationally connected to the thrusting slider. In these extensions, the inner tube is provided with a row of notches of predefined shape, the sleeve is fixed to the outer tube and the constraining means and the thrusting slider are movably supported in said sleeve. The resilient means are also housed in said sleeve.

The thrusting slider acts on the constraining means, under the action of the resilient means, so as to force the constraining means inside a notch of inner tube and lock the inner tube inside the outer tube.

The actuating means, in turn, are capable of disengaging the thrusting slider from the constraining means so as to leave the constraining means free to move radially and come out of a notch of the inner tube. In this way the inner tube is disengaged from the outer tube and may be made to slide with respect to the outer tube so as to adjust the length of the extension.

In order to house said sleeve, some conventional telescopic extensions have an outer tube provided with a flaring (widened portion). An extension of this kind is described in EP-B1-0 293 518. The flaring of the outer pipe makes the extension somewhat voluminous and difficult to handle.

Alternatively, the locking and releasing slider is mounted in a projection of the sleeve seated in a niche formed in the outer tube by means of drawing.

Both these types of telescopic extension therefore require a controlled deformation of the outer tube. This type of processing technique has the following disadvantages:

it requires the use of proper machines,
it lengthens the working times,
it requires the use of costly materials having a high yield strength,
it produces a large amount of production rejections.

In order to overcome the drawbacks arising from having to deform the outer tube, EP-A2-0 601 620 proposes a telescopic extension having an outer tube with a cross-section of substantially constant diameter onto which a double sleeve is fastened. However, this extension is also fairly voluminous and costly because it comprises numerous components and requires fairly long assembly times.

DE-196 15 814 discloses a telescopic extension for a vacuum cleaner comprising an inner tube and an outer tube which slide inside one another and are made integral by means of one constraining element. Said outer tube has a flared portion and a sleeve is fastened to said flared portion and supports said inner tube. Said sleeve is provided with a longitudinal protrusion which engages a longitudinal groove of said inner tube and guides its sliding movements. Said longitudinal groove has a bottom portion provided with notches capable of housing said constraining element. An actuating slider is interposed between said flared portion of said outer tube and said sleeve and causes displacements of said constraining element for locking and unlocking said inner and outer tubes. Said actuating slider shows a locking retainer capable of keeping said constraining element in a locking position in a notch of the inner tube. Moreover, said actuating slider has a first hemispherical niche for housing said constraining element in a disengaging position and a second semicylindrical niche for housing a spring. Furthermore, said actuating slider is provided with a knob which is placed in a front edge of said outer tube in the longitudinal sliding direction of said actuating slider.

Owing to the presence of said first and second niche, said actuating slider has a fairly high thickness and said outer tube flared portion is provided with an enlarged tunnel-like seat capable of housing said actuating slider. Thus, said outer tube undergoes two deformations in order to form said flared portion and said tunnel-like seat. Therefore, the manufacture of said telescopic extension is troublesome and expensive. Moreover, the overall transversal dimension of said telescopic extension is large, unhandy and unaesthetic.

It is an object of the present invention to overcome the abovementioned drawbacks.

This object is achieved, according to the invention, by means of a telescopic extension for an electric household appliance comprising:

a) an inner tube and an outer tube sliding inside one another,
b) a sleeve fastened to said outer tube,
c) at least one first constraining means capable of locking together said inner tube and said outer tube,
d) a flat and long thrusting slider, engaging at least said first constraining means under the action of resilient means, and
e) actuating means operationally connected to said thrusting slider,
f) said inner tube being provided with a row of notches of predefined shape,
g) said outer tube having a cross-section of substantially constant diameter and having a lateral opening,
h) said first constraining means and thrusting slider being movably supported by said sleeve,
i) said thrusting slider acting on said first constraining means, through the action of said resilient means, so as to force said constraining means inside a first notch of said inner tube and lock said inner tube inside said outer tube;
j) said actuating means being capable of disengaging said thrusting slider from said first constraining means so as to leave said first constraining means free to move radially and come out of said first notch, releasing said inner tube from said outer tube and allowing said inner tube to slide with respect to said outer tube so as to adjust the length of said extension, characterized in that
k) said sleeve is arranged between said inner tube and said outer tube having a cross-section of substantially constant diameter,
l) said sleeve is provided with a longitudinal cavity and a recess formed on a bottom wall of said cavity,
m) said thrusting slider is housed in said longitudinal cavity and is retained radially by said outer tube,
n) said thrusting slider is provided with at least one first slot, and
o) said resilient means are housed in said first slot of said thrusting slider and engage said recess of said sleeve.

Preferably, said lateral opening of said outer tube extends as far as one end thereof and said sleeve has an external longitudinal projection which engages said opening so as to couple said outer tube with said sleeve and centre said outer tube with respect to said sleeve.

Advantageously, said lateral opening of said outer tube has dimensions such as to make accessible said thrusting slider housed in said longitudinal cavity of said sleeve.

Preferably, said thrusting slider is also provided with at least one second slot designed to receive said first constraining means when said slider moves longitudinally, in a first direction, and said first constraining means moves radially and comes out of said first notch of said inner tube.

In turn, said second slot has an inclined side which is designed to exert a radial thrust on said first constraining means.

Advantageously, said extension also comprises a second constraining means designed to engage a second notch of said inner tube, said thrusting slider being provided with a third slot designed to receive said second constraining means when said slider moves longitudinally, in said first direction, and said second constraining means moves radially and comes out of said second notch of said inner tube.

Preferably, said third slot has an inclined side which is designed to exert a radial thrust on said second constraining means.

Moreover, said thrusting slider is provided with a fourth and a fifth slot which are designed to receive said first and said second constraining means, respectively, when said slider moves longitudinally, in the opposite direction to said first direction, and said first constraining means and said second constraining means move radially, respectively, and come out of said first and said second notch, respectively.

Advantageously, said fourth and fifth slot have a respective side inclined in the opposite direction to that of said sides of said second and third slot.

Preferably, said thrusting slider is provided with a projecting, substantially perpendicular tongue.

Advantageously, said tongue of said thrusting slider emerges from said lateral opening of said outer tube so as to engage said actuating means.

Preferably, said tongue of said thrusting slider has undercuts and said actuating means consist of a pushbutton having a pocket provided with additional undercuts which snap-engage said undercuts in said tongue.

According to a variant, said actuating means consist of a ring nut provided with a bayonet joint which engages said tongue of said thrusting slider and with a relief on said outer tube so as to lock together said ring nut and said slider for the longitudinal movements and allow said ring nut to move longitudinally with respect to said outer tube.

Preferably, said sleeve is provided with a collar against which said end of said outer tube comes into abutment, said collar and said external projection having a thickness substantially equal to that of said outer tube such that it remains flush with said collar and said external projection.

Advantageously, said sleeve has an internal longitudinal overhang and said inner tube has a longitudinal groove with which said internal longitudinal overhang of said sleeve engages so as to centre said sleeve with respect to said inner tube.

Preferably, said longitudinal groove has a bottom wall provided with said notches, and said internal longitudinal overhang of said sleeve, which engages with said groove, is arranged underneath said longitudinal cavity which houses said thrusting slider.

The telescopic extension of the invention has the advantage of being extremely compact and particularly resistant to operating stresses, such as axial thrusts and torque.

Moreover, it may be assembled using a considerably simplified process which allows production times and costs to be reduced and which may be easily automated.

During the course of the present description and the claims, the expression "tube having a cross-section of substantially constant diameter" is used to indicate that the tube is without a deformed portion designed to house the sleeve wholly or partly. However, there may be deformations of the tube which have a different function.

Characteristic features and advantages of the invention will now be illustrated with reference to an embodiment shown by way of example in the accompanying drawings, in which.

FIGS. 1–6 show a telescopic extension 1 for an electric household appliance, such as a vacuum cleaner. The extension 1 comprises an inner tube 2, an outer tube 3, a sleeve 4, constraining means 5 and 6, a thrusting slider 7 and actuating means 8.

The inner tube and outer tube 2 and 3 are sealingly slidable inside each other. A seal arranged between inner tube and outer tube is not shown. The tubes 2 and 3 are made, for example, of stainless-steel sheet metal chrome-plated externally.

The inner tube 2 has a longitudinal, substantially parallelepiped-shaped groove 10 with a bottom wall 11 in which a row of notches 12 is formed. The notches 12 have a partially cylindrical shape and the constraining means 5 and 6 consisting of small steel cylinders engage two of them simultaneously.

Figure 7:
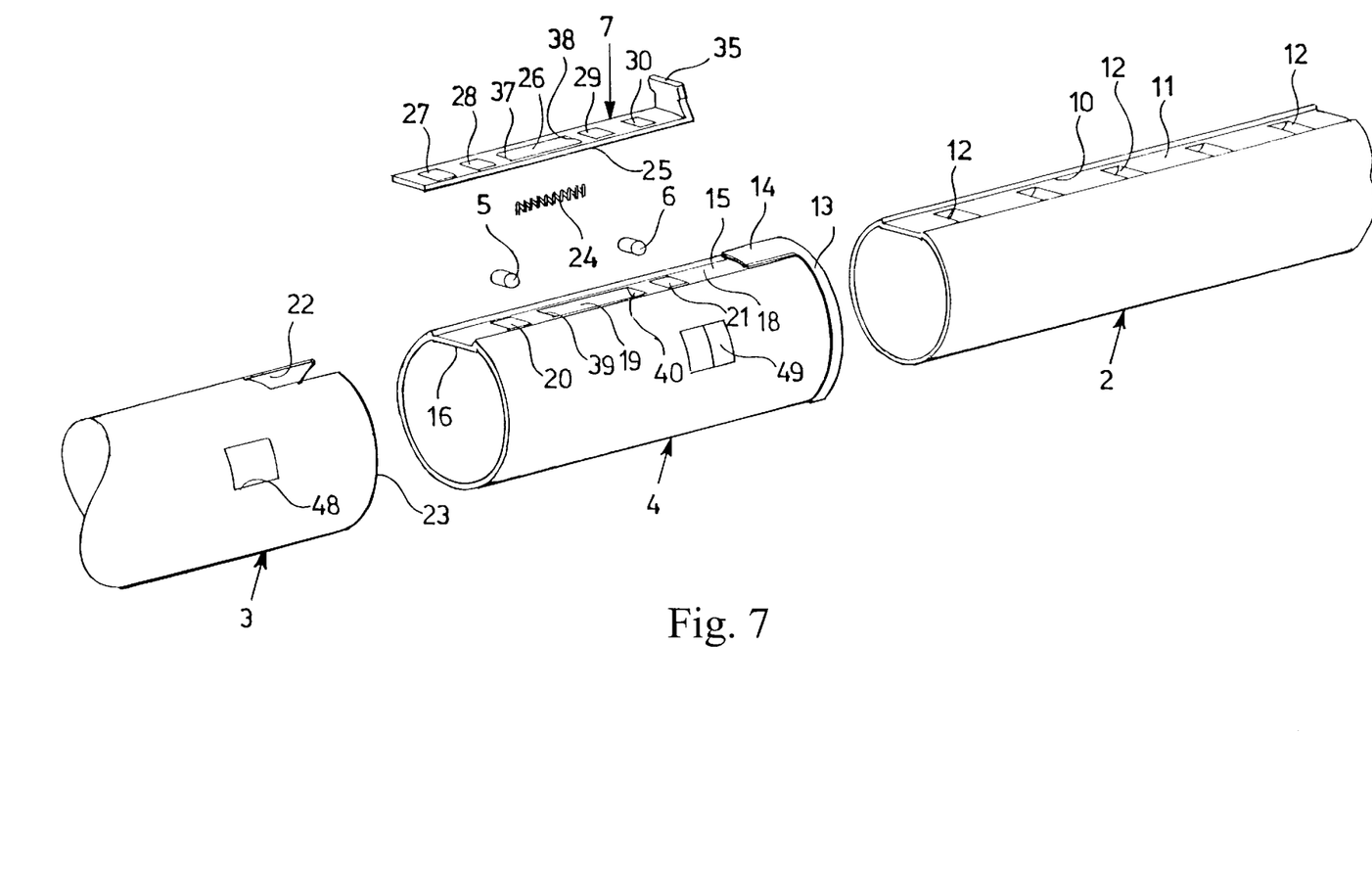
FIG. 7 is an exploded view of the extension of FIG. 1.
Figure 8:
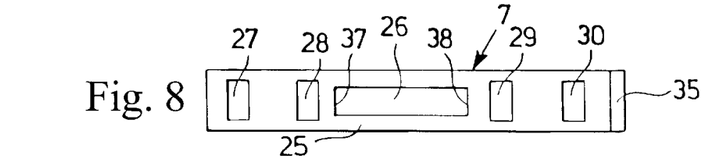
FIG. 8 is a top view of a thrusting slider of the extension of FIG. 1.
Figure 9:
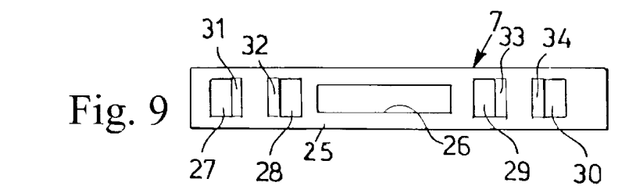
FIGS. 9, 10 and 11 are, respectively, a bottom view, left-hand side view and right-hand side view of the slider of FIG. 8.

The sleeve 4 is provided with a longitudinal cavity 15, an external projection 14, a collar 13 and an internal overhang 16 (FIG. 7). The external projection 14 has a substantially parallelepiped shape and is aligned with the cavity 15. The cavity 15 has a bottom wall 18 having a substantially parallelepiped-shaped recess 19 with end walls 39 and 40, and two rectangular slots 20 and 21 which guide the cylinders 5 and 6 during the radial movements which they perform in order to engage a respective notch 12 of the inner tube 2 and disengage therefrom. The internal overhang 16 has a substantially parallelepiped shape and length equal to that of the sleeve 4. The sleeve 4 is, for example, made of suitable plastic material.

Figure 5:
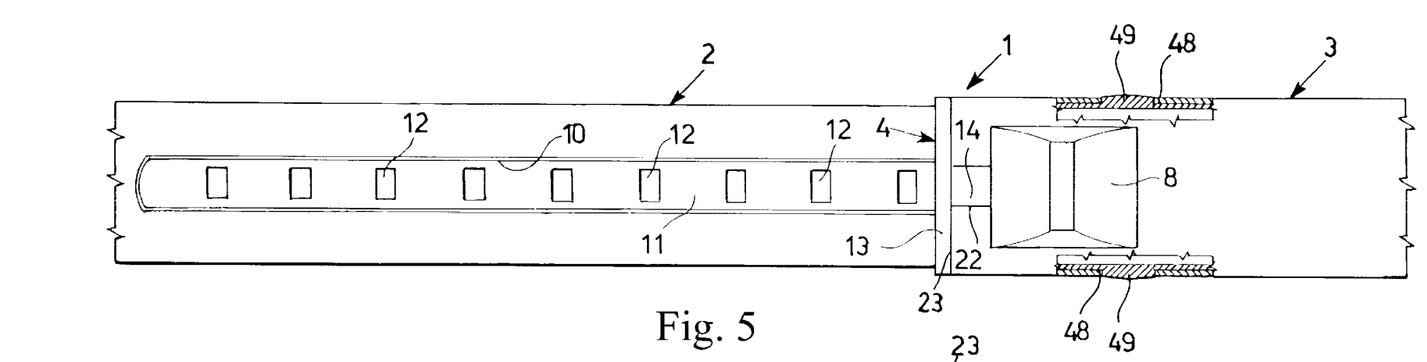
FIG. 5 is a top view of the extension of FIG. 1.
Figure 6:
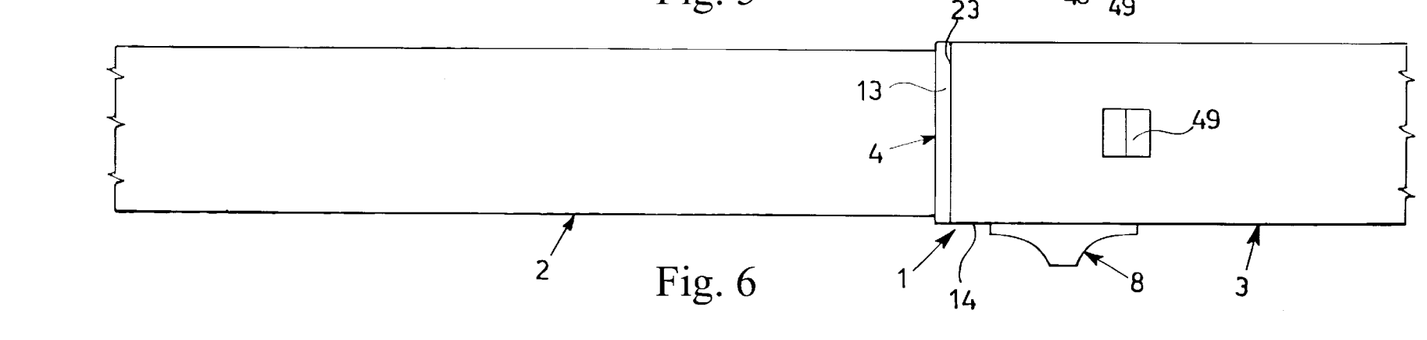
FIG. 6 is a side view of the extension of FIG. 1.

The outer tube 3 has a lateral opening 22 which extends as far as one end 23 and engages an external projection 14 of the sleeve 4 until the end 23 of the outer tube comes into abutment against the collar 13 of the sleeve (FIGS. 5–7). Thus the outer tube engages with the sleeve and is centred with respect thereto, remaining flush with the collar 13 and with the projection 14 since the latter have a thickness which is practically equal to that of the outer tube. Since the opening 22 of the outer tube 3 has a length greater than the projection 14 of the sleeve 4, it leaves free a small window 9, the function of which will be illustrated below. The outer tube 3 has two square holes 48 with which the projections 49 of the sleeve 4 engage (FIGS. 5, 6 and 7) so as to fasten the outer tube and sleeve to each other.

The longitudinal cavity 15 of the sleeve 4 houses the thrusting slider 7 and a helical spring 24.

The thrusting slider 7 is formed by a long, narrow and thin rectangular plate 25 provided with slots 26, 27, 28, 29 and 30 and having at one end a projecting tongue 35 which is substantially perpendicular and provided with undercuts 36 (FIGS. 8–11). The tongue 35 projects from the window 9 left by the opening 22 of the outer tube when it comes into abutment against the collar 13 of the sleeve 4. The slot 26 has a rectangular shape and greater axis directed longitudinally, while the four slots 27, 28, 29 and 30 have a rectangular shape and a greater axis directed transversely. The slot 26 has end sides 37 and 38. The slots 27 and 28 have respective end sides 31 and 32 inclined in opposite directions and the slots 29 and 30 have respective end sides 33 and 34 inclined in opposite directions. The inclined sides 31, 32, 33 and 34 of the slots 27, 28, 29 and 30 exert a downwards thrust on the cylinders 5 or 6, when they are located outside the notches 12 (FIGS. 3 and 4), as will be illustrated below. The thrusting slider 7 is, for example, made of suitable plastic material and the plate 25 has a length of about 55 mm, width of about 8 mm and thickness of about 1.8 mm. The sides 31, 32, 33 and 34 of the slots are inclined with respect to the vertical at an angle of about 70°.

The helical spring 24 is supported by the slot 26 of the slider 7 and engages the recess 19 of the sleeve 4. The spring 24 is mounted pre-tensioned inside the slot 26 with one half of its end spirals making contact with the sides 37 and 38 of the slot 26 and with the other half making contact with the sides 39 and 40 of the recess 19.

Figure 10:
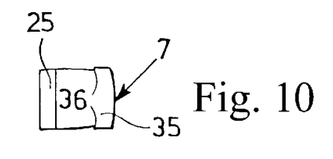
Figure 11:
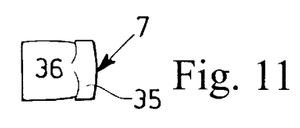
Figure 12:
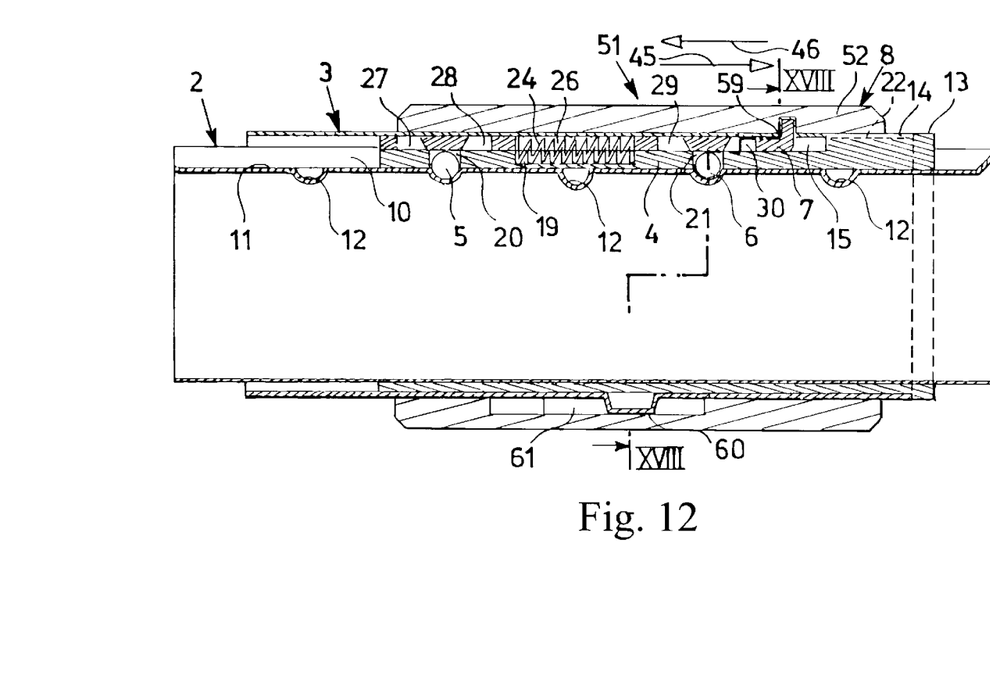
FIG. 12 is a longitudinally sectional view of a variant of the telescopic extension of FIG. 1.
Figure 13:
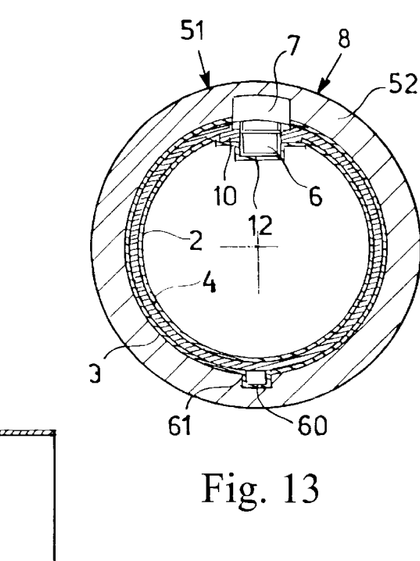
FIG. 13 is a cross-sectional view along the plane XIII—XIII of FIG. 12.
Figure 14:
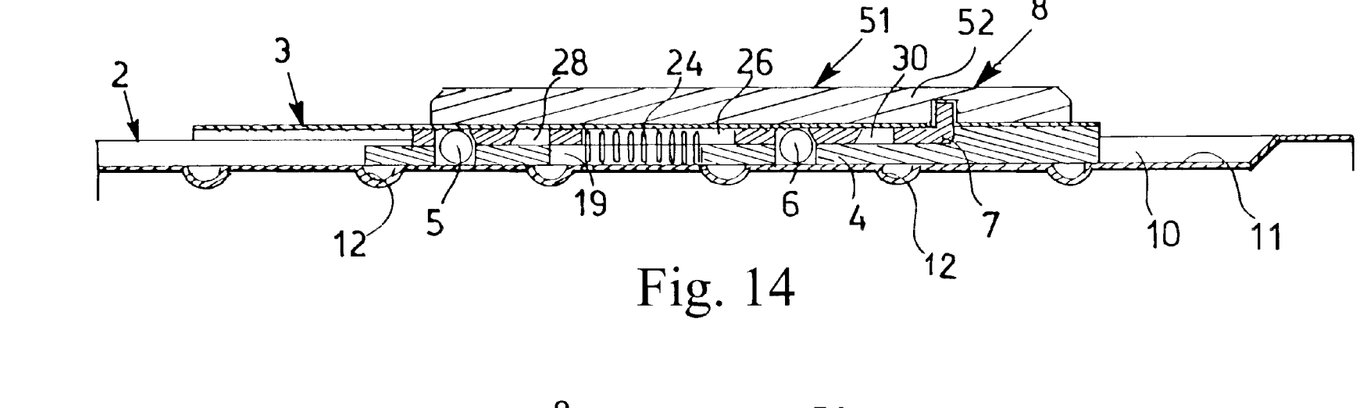
FIG. 14 shows partially the extension of FIG. 12 in a first operating condition.
Figure 15:
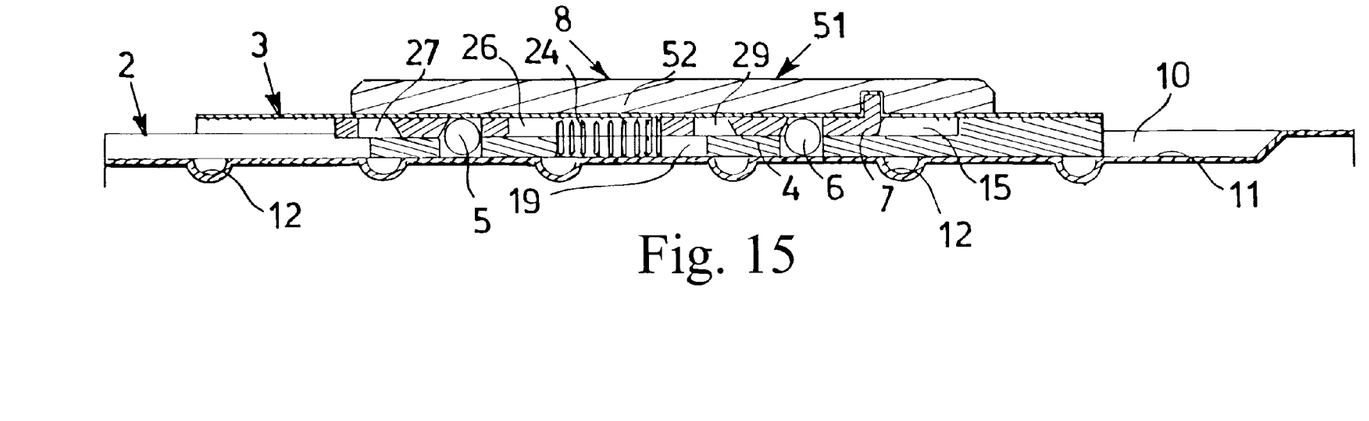
FIG. 15 shows partially the extension of FIG. 12 in a second operating condition.

The actuating means 8 are formed by a pushbutton 41 which is fastened to the slider 7. The pushbutton 41 has a pocket 42 provided with undercuts 43 (FIG. 2) which engage the undercuts 36 of the tongue 35 of the thrusting slider 7 (FIGS. 10 and 11).

In the extension 1, the plate 25 of the thrusting slider 7 has a minimal thickness owing to the presence of the slots 26, 27, 28, 29 and 30 which perform the functions indicated above.

Figure 1:
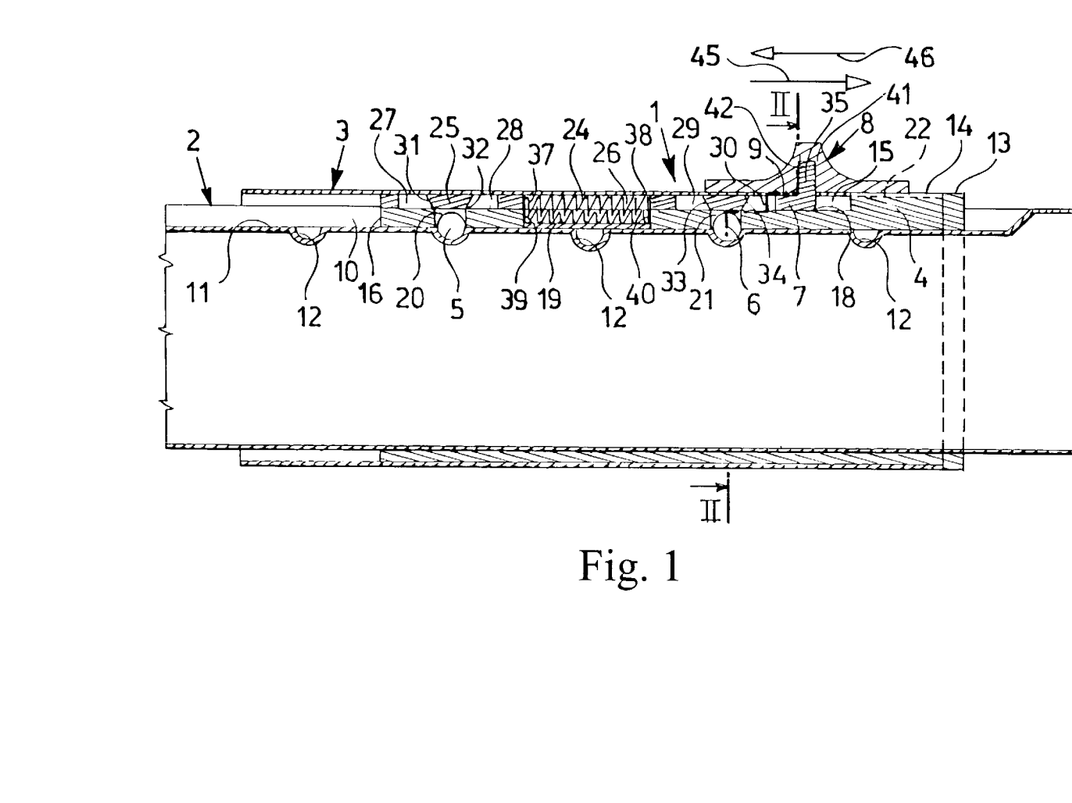
FIG. 1 is a longitudinally sectional view of a telescopic extension for an electric household appliance, embodied according to the invention.
Figure 2:
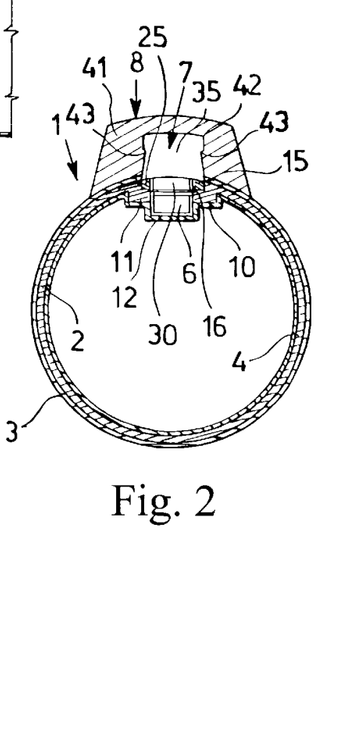
FIG. 2 is a cross-sectional view along the plane II—II of FIG. 1.
Figure 3:
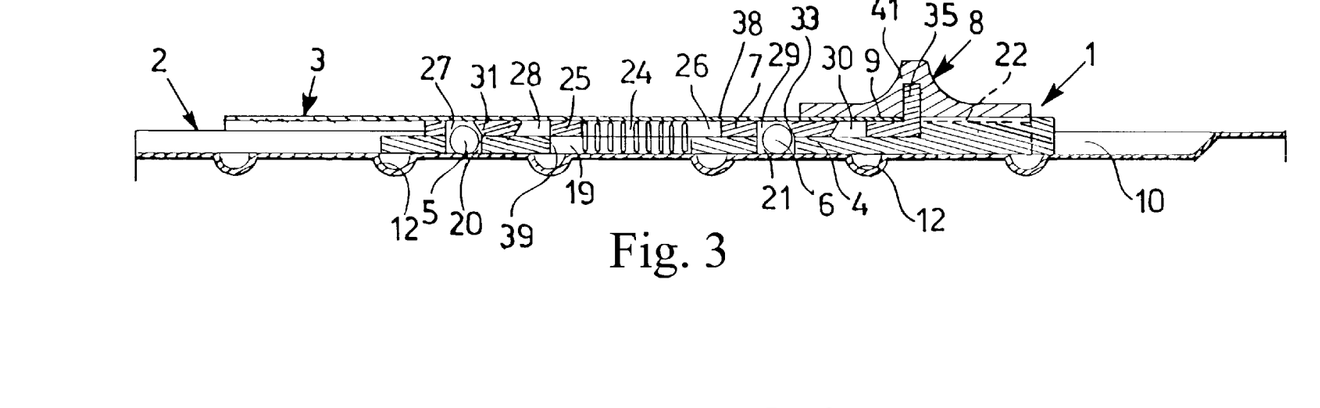
FIG. 3 shows partially the extension of FIG. 1 in a first operating condition.
Figure 4:
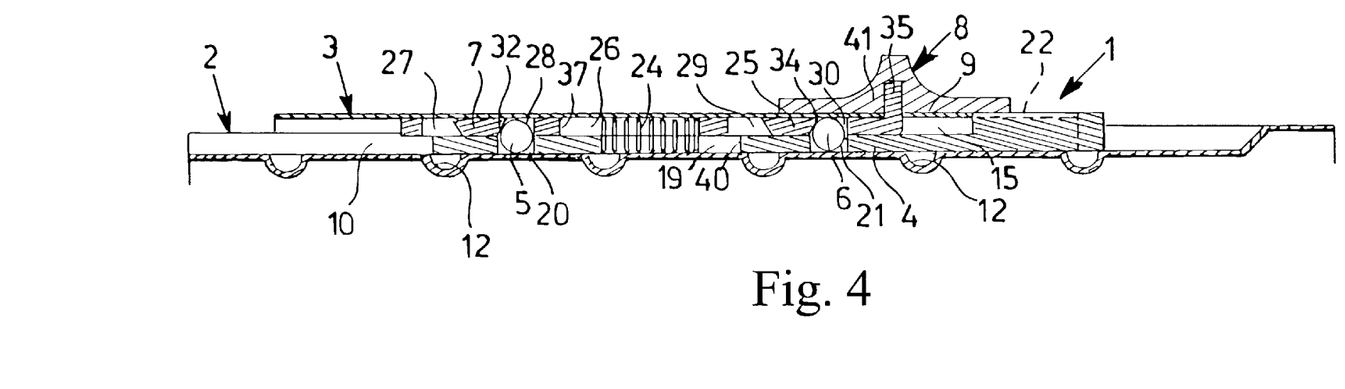
FIG. 4 shows partially the extension of FIG. 1 in a second operating condition.

The pushbutton 41 and the slider 7 assume a rest position, shown in FIG. 1, intermediate between two opposite active positions, shown respectively in FIG. 3 and FIG. 4, when the spring 24 is located in the initial assembly condition with both its end spirals in contact with the sides 37 and 38 of the slot 26 and with the sides 39 and 40 of the recess 19. When the pushbutton 41 and the slider 7 are in the rest condition, the cylinders 5 and 6 are forced inside the respective notches 12 of the inner tube 2. In this condition, the inner tube 2 and outer tube 3 are firmly joined together and form an extension 1 of pre-selected length.

In order to adjust the length of the extension 1, the pushbutton 41 is pushed manually in the right-hand or left-hand direction, as shown by the arrows 45 and 46 (FIG. 1). The pushbutton 41, by means of the tongue 35 which moves inside the window 9, brings the slider 7 into the right-hand active position (FIG. 3) or into the left-hand active position (FIG. 4). When the slider 7 assumes one of the two active positions, it leaves the cylinders 5 and 6 free to come out of the notches 12 of the inner tube 2 and move radially, guided by the slots 20 and 21 of the sleeve 4, so as to penetrate into its slots 27 and 29 (FIG. 3) or 28 and 30 (FIG. 4).

This allows the tube 2 to slide inside the tube 3 until it reaches the desired length of the extension 1.

Upon release of the pushbutton 41, the slider 7 pushes again the cylinders 5 and 6 inside the notches 12 of the inner tube 2, by means of the inclined sides 31 and 33 of its slots 27 and 29 or 32 and 34 of its slots 28 and 30.

The procedure for assembly of the telescopic extension 1 comprises the following steps:

i. the sleeve 4 is mounted on the inner tube 2, coupling its internal overhang 16 with the longitudinal groove 10 of the inner tube;

ii. the costraining cylinders 5 and 6 are inserted through the slots 20 and 21 of the sleeve 4 and positioned in two respective notches 12 of the inner tube 2;

iii. the spring 24 is mounted pre-tensioned inside the slot 26 of the thrusting slider 7;

iv. the slider is housed inside the longitudinal cavity 15 of the sleeve 4 so that the spring 24 also engages with the recess 19 of the sleeve 4, such that the slider 7 is correctly positioned in the rest position;

v. the outer tube 3 is mounted on the sleeve 4 engaging its lateral opening 22 and its square holes 48 with the external projection 14 and with the projections 49 of the sleeve, respectively, until its end 23 comes into abutment against the collar 13 of the sleeve;

vi. in this position the tongue 35 of the slider 7 projects from the window 9 left free by the opening 22 and the pushbutton 41 may be fixed to it by snap-engagement.

Therefore, assembly of the extension 1 requires few and easy operations.

Figure 16:
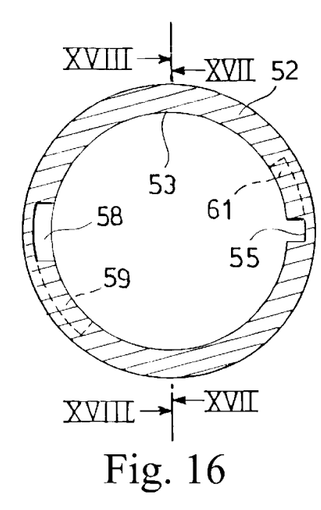
FIG. 16 is a cross-sectional view of an operating ring nut of the extension of FIG. 12.
Figure 17:
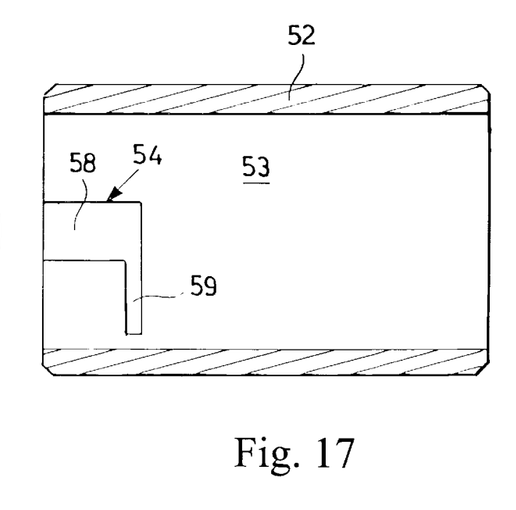
FIG. 17 is a cross-sectional view along the plane XVII—XVII of FIG. 16.
Figure 18:
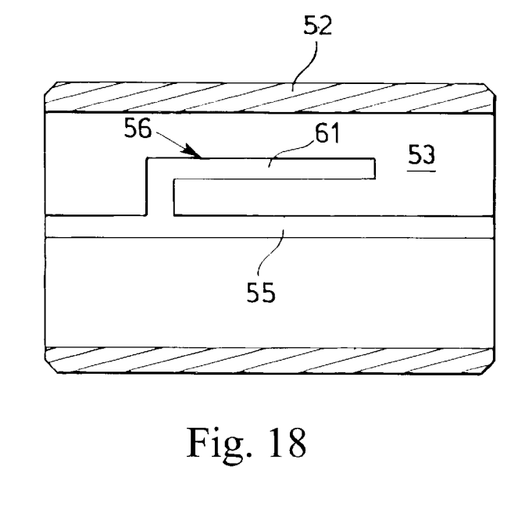
FIG. 18 is a cross-sectional view along the plane XVIII—XVIII of FIG. 16.

FIGS. 12–15 show a variant of the extension of FIG. 1, indicated by 51, in which identical parts are indicated by the same numbers. In the telescopic extension 51, the actuating means 8 of the slider 7 are formed by a ring nut 52. The ring nut 52 has an internal wall 53 in which there is a groove 54 which is substantially L-shaped and a longitudinal groove 55 joined to a groove 56 which is substantially L-shaped (FIGS. 16–18). The groove 54 has a longitudinal branch 58 with a width equal to that of the tongue 35 of the slider 7 and a transverse branch 59 with a width equal to the thickness of the tongue 35. The longitudinal groove 55 has a width which is equal to that of a relief 60 formed in the outer tube 3 and also the L-shaped groove 56 has a longitudinal branch 61 with a width equal to that of the relief 60. The ring nut 52 is fixed to the slider 7 causing the tongue 35 to slide first in the branch 58 of the L-shaped groove 54 with a longitudinal movement of the ring nut 52 and then in the branch 59 of the groove 54 with a rotating movement of the ring nut. When the ring nut 52 performs the longitudinal movement, the relief 60 of the tube 3 slides inside the longitudinal groove 55 and when the ring nut performs the rotating movement, the relief 60 is inserted in the branch 61 of the L-shaped groove 56. Thus the ring nut 52 is fastened to the slider 7 by means of a bayonet joint, while it is free to slide longitudinally with respect to the outer tube 3 and may cause the longitudinal displacements of the slider 7 so as to adjust the length of the extension 51.

What is claimed is:

1. Telescopic extension for an electric household appliance comprising:
   a) an inner tube and an outer tube sliding inside one another,
   b) a sleeve fastened to said outer tube,
   c) at least one first constraining means capable of locking together said inner tube and said outer tube,
   d) a flat and long thrusting slider, engaging at least said first constraining means under the action of resilient means, and
   e) actuating means operationally connected to said thrusting slider,
   f) said inner tube being provided with a row of notches of predefined shape,
   g) said outer tube having a cross-section of substantially constant diameter and having a lateral opening,
   h) said first constraining means and thrusting slider being movably supported by said sleeve,
   i) said thrusting slider acting on said first constraining means, through the action of said resilient means, so as to force said first constraining means inside a first notch of said inner tube and lock said inner tube inside said outer tube;
   j) said actuating means being capable of disengaging said thrusting slider from said first constraining means so as to leave said first constraining means free to move radially and come out of said first notch, releasing said inner tube from said outer tube and allowing said inner tube to slide with respect to said outer tube so as to adjust the length of said extension, characterized in that
   k) said sleeve is arranged between said inner tube and said outer tube having a cross-section of substantially constant diameter,
   l) said sleeve is provided with a longitudinal cavity and a recess formed on a bottom wall of said cavity,
   m) said thrusting slider is housed in said longitudinal cavity and is retained radially by said outer tube,
   n) said thrusting slider is provided with at least one first slot, and
   p) said resilient means are housed in said first slot of said thrusting slider and engage said recess of said sleeve.

2. Telescopic extension according to claim 1, characterized in that said lateral opening of said outer tube extends as far as one end thereof and said sleeve has an external longitudinal projection which engages said opening so as to couple said outer tube with said sleeve and centre said outer tube with respect to said sleeve.

3. Telescopic extension according to claim 1, characterized in that said lateral opening of said outer tube has dimensions such as to make accessible said thrusting slider housed in said longitudinal cavity of said sleeve.

4. Telescopic extension according to claim 1, characterized in that said thrusting slider is also provided with at least one second slot designed to receive said first constraining means when said slider moves longitudinally, in a first direction, and said first constraining means moves radially and comes out of said first notch of said inner tube.

5. Telescopic extension according to claim 4, characterized in that said second slot has an inclined side which is designed to exert a radial thrust on said first constraining means.

6. Telescopic extension according to claim 4, further comprising a second constraining means designed to engage a second notch of said inner tube, said thrusting slider being provided with a third slot designed to receive said second constraining means when said slider moves longitudinally, in said first direction, and said second constraining means moves radially and comes out of said second notch of said inner tube.

7. Telescopic extension according to claim 6, characterized in that said third slot has an inclined side which is designed to exert a radial thrust on said second constraining means.

8. Telescopic extension according to claim 4, characterized in that said thrusting slider is provided with a fourth and a fifth slot which are designed to receive said first and said second constraining means, respectively, when said slider moves longitudinally, in the opposite direction to said first direction, and said first constraining means and said second constraining means move radially, respectively, and come out of said first and said second notch, respectively.

9. Telescopic extension according to claim 8, characterized in that said fourth and fifth slot have a respective side inclined in the opposite direction to that of said sides of said second and third slot.

10. Telescopic extension according to claim 1, characterized in that said thrusting slider is provided with a projecting, substantially perpendicular tongue.

11. Telescopic extension according to claim 3, characterized in that said tongue of said thrusting slider projects from said lateral opening of said outer tube so as to engage said actuating means.

12. Telescopic extension according to claim 11, characterized in that said tongue of said thrusting slider has undercuts and said actuating means consist of a pushbutton having a pocket provided with additional undercuts which snap-engage said undercuts in said tongue.

13. Telescopic extension according to claim 11, characterized in that said actuating means consist of a ring nut provided with a bayonet joint which engages said tongue of said thrusting slider and with a relief on said outer tube so as to lock together said ring nut and said slider for the longitudinal movements and allow said ring nut to move longitudinally with respect to said outer tube.

14. Telescopic extension according to claim 2, characterized in that said sleeve is provided with a collar against which said end of said outer tube comes into abutment, said collar and said external projection having a thickness substantially equal to that of said outer tube such that it remains flush with said collar and said external projection.

15. Telescopic extension according to claim 1, characterized in that said sleeve has an internal longitudinal overhang and said inner tube has a longitudinal groove with which said internal longitudinal overhang of said sleeve engages so as to centre said sleeve with respect to said inner tube.

16. Telescopic extension according to claim 15, characterized in that said longitudinal groove has a bottom wall provided with said notches, and said internal longitudinal overhang of said sleeve, which engages with said groove, is arranged underneath said longitudinal cavity which houses said thrusting slider.

17. Telescopic extension according to claim 1, wherein the at least one first slot of the thrusting slider extends substantially radially through the thrusting slider.

18. Telescopic extension according to claim 1, wherein the recess formed on the bottom wall of said cavity of the sleeve extends substantially radially through the bottom wall.

19. A telescopic extension for an electric household appliance comprising:

an inner tube and an outer tube sliding inside one another, a sleeve situated between the outer tube and the inner tube, at least one first constraining element capable of locking together the inner tube and the outer tube, a flat and long thrusting slider, engaging at least said first constraining element under the action of resilient means, and the inner tube being provided with a row of notches, the outer tube having a cross-section of substantially constant diameter, the first constraining element and the thrusting slider being movably supported by the sleeve, the thrusting slider acting on the first constraining element, through the action of the resilient means, so as to force the first constraining element inside a first notch of the inner tube and lock the inner tube inside the outer tube;

an actuator being capable of disengaging the thrusting slider from said first constraining element so as to leave the first constraining element free to move radially and come out of the first notch, releasing the inner tube from the outer tube and allowing the inner tube to slide with respect to the outer tube so as to adjust the length of the extension, the sleeve being provided with a longitudinal cavity and a recess formed on a bottom wall of the cavity, the thrusting slider being housed in the longitudinal cavity and retained radially by the outer tube, the thrusting slider being provided with at least one first slot, and the resilient means being housed in the first slot of the thrusting slider and engaging the recess of the sleeve.

20. A telescopic extension according to claim 19, wherein the outer tube has a cross-section of substantially constant first diameter.

21. A telescopic extension according to claim 19, wherein the sleeve has a cross-section of substantially constant second diameter.

22. A telescopic extension according to claim 19, characterized in that said thrusting slider is also provided with at least one second slot designed to receive the first constraining element when the slider moves longitudinally, in a first direction, and the first constraining element moves radially and comes out of the first notch of the inner tube.

23. A telescopic extension according to claim 22, characterized in that the second slot has an inclined side which is designed to exert a radial thrust on the first constraining element.

24. A telescopic extension according to claim 22, further comprising a second constraining element designed to engage a second notch of the inner tube, the thrusting slider being provided with a third slot designed to receive the second constraining element when the slider moves longitudinally, in the first direction, and the second constraining element moves radially and comes out of the second notch of the inner tube.

25. A telescopic extension according to claim 24, characterized in that the third slot has an inclined side which is designed to exert a radial thrust on the second constraining element.

26. A telescopic extension according to claim 22, characterized in that the thrusting slider is provided with a fourth and a fifth slot which are designed to receive the first and the second constraining elements, respectively, when the slider moves longitudinally, in the opposite direction to the first direction, and the first constraining element and the second constraining element move radially, respectively, and come out of said first and said second notch, respectively.

27. A telescopic extension according to claim 26, characterized in that the fourth and fifth slot have a respective side inclined in the opposite direction to that of the sides of the second and third slot.

28. A telescopic extension according to claim 19, wherein the at least one first slot of the thrusting slider extends substantially radially through the thrusting slider.

29. A telescopic extension according to claim 19, wherein the recess formed on the bottom wall of said cavity of the sleeve extends substantially radially through the bottom wall.

* * * * *